(12) United States Patent
Basiji et al.

(10) Patent No.: US 6,384,951 B1
(45) Date of Patent: May 7, 2002

(54) HIGH THROUGHPUT OPTICAL SCANNER

(75) Inventors: David A. Basiji; Gerrit J. van den Engh; Richard J. Esposito, all of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/551,088

(22) Filed: Apr. 18, 2000

Related U.S. Application Data

(62) Division of application No. 09/196,476, filed on Nov. 19, 1998.
(60) Provisional application No. 60/066,138, filed on Nov. 19, 1997.

(51) Int. Cl.⁷ .............................................. G02B 26/08
(52) U.S. Cl. ...................... 359/212; 359/216; 250/584; 250/585; 250/586; 250/591; 356/417
(58) Field of Search ........................ 359/216, 196–215, 359/217–227; 356/417; 250/584, 585, 586, 591, 234

(56) References Cited

U.S. PATENT DOCUMENTS

| | | | | |
|---|---|---|---|---|
| 3,520,586 A | * | 7/1970 | Bousky | 359/208 |
| 3,857,636 A | | 12/1974 | Angelbeck | 356/106 R |
| 3,966,319 A | * | 6/1976 | Lang | 355/66 |
| 3,988,573 A | | 10/1976 | Hayosh et lal | 235/61.11 |
| 4,200,801 A | * | 4/1980 | Schuresko | 250/458 |
| 4,576,173 A | * | 3/1986 | Parker | 128/633 |
| 4,741,620 A | * | 5/1988 | Wickramasinghe | 356/349 |
| 5,220,449 A | | 6/1993 | Kuroda | 359/208 |
| 5,635,321 A | | 6/1997 | Van Hunsel et al. | 430/30 |
| 5,635,727 A | | 6/1997 | Niimura | 250/583 |
| 5,969,346 A | | 10/1999 | Nagasaka et al. | 250/234 |

* cited by examiner

Primary Examiner—Cassandra Spyrou
Assistant Examiner—Leo Boutsikaris
(74) Attorney, Agent, or Firm—Greenlee, Winner and Sullivan, P.C.

(57) ABSTRACT

A scanning apparatus is provided to obtain automated, rapid and sensitive scanning of substrate fluorescence, optical density or phosphorescence. The scanner uses a constant path length optical train, which enables the combination of a moving beam for high speed scanning with phase-sensitive detection for noise reduction, comprising a light source, a scanning mirror to receive light from the light source and sweep it across a steering mirror, a steering mirror to receive light from the scanning mirror and reflect it to the substrate, whereby it is swept across the substrate along a scan arc, and a photodetector to receive emitted or scattered light from the substrate, wherein the optical path length from the light source to the photodetector is substantially constant throughout the sweep across the substrate. The optical train can further include a waveguide or mirror to collect emitted or scattered light from the substrate and direct it to the photodetector. For phase-sensitive detection the light source is intensity modulated and the detector is connected to phase-sensitive detection electronics. A scanner using a substrate translator is also provided. For two dimensional imaging the substrate is translated in one dimension while the scanning mirror scans the beam in a second dimension. For a high throughput scanner, stacks of substrates are loaded onto a conveyor belt from a tray feeder.

11 Claims, 12 Drawing Sheets

POSITION

HIGH THROUGHPUT OPTICAL SCANNER

This application takes priority from U.S. Provisional Application No. 60/066,138 filed Nov. 19, 1997, and is a divisional of U.S. Ser. No. 09/196,476 filed Nov. 19, 1998, both of which are incorporated herein in their entirety to the extent not incompatible herewith.

FIELD OF THE INVENTION

This invention relates to optical scanning of substrates, and in particular to efficient and uniform collection of emitted or scattered light. The invention includes the application of phase sensitive detection to scanned images to improve the discrimination of multiple signal sources and reduce noise. It is particularly useful for automated, rapid and sensitive fluorescent gel scanning.

BACKGROUND OF THE INVENTION

Large-scale genome and proteome projects involve assay techniques that are significantly hindered by current substrate imaging techniques. For example, gel electrophoresis is a critical but slow step in analyses of nucleic acid sequences and proteins. DNA or protein samples are often electrophoresed in a gel, which separates sample components, and this is followed by formation of an image for quantitation. A gel image can be produced by using a radio-labeled sample and exposing the gel to an x-ray film or storage phosphor plate followed by film development or phosphorescence quantitation. Radioactive labeling, while sensitive, is hazardous and expensive. Fluorescent dyes which bind to the sample and thereupon fluoresce brightly are a preferred method of sample labeling. Application of fluorescence labeling to slab gel electrophoresis and other two-dimensional analysis substrates creates a need for fluorescence imaging instrumentation. Fluorescent intensity images can be created by photographing the substrate or imaging it with a charge coupled device (CCD) areal detector chip. Photography is non-quantitative due to the film's highly non-linear exposure/density function. A CCD detector is capable of quantifying the fluorescence intensity of an image but the spatial resolution is limited by the number of pixels on the chip itself. Both forms of detection involve the use of cameras which have relatively poor collection efficiency, rely on broad and even illumination, and require optics which minimize geometric distortion. These constraints become more acute when imaging large substrates such as electrophoresis gels. Further, cameras are not configured for the rejection of background light, resulting in high background levels.

One alternative for fluorescence quantitation of substrates is image scanning. The fluorescence is measured sequentially at each point in a substrate, creating an image based upon millions of individual pixel measurements. Scanning systems quantify only one point at a time and do not require imaging optics, allowing the optical system to be optimized for collection efficiency and to satisfy other constraints. Fluorescence is typically excited by a laser, which is far brighter and more uniform than other forms of illumination. There are two types of designs for scanning systems and in both types the time required to produce a scanned image increases with the area of the substrate. Scanning-head designs physically translate the excitation and collection optics over the substrate area, resulting in high collection efficiency and noise rejection at the expense of speed. Scanning-beam designs, also commonly termed scanning-spot and flying-spot, accomplish rapid movement of an illumination spot separate from a stationary or slow-moving collection system, imaging rapidly at the expense of collection efficiency.

The designs of existing fluorescence scanning devices provide a trade-off between scanning optic detection systems with high sensitivity and scanning beam detection systems with speed but low sensitivity. Neither system architecture achieves maximum image noise rejection because neither system architecture can eliminate non-random background noise. Background noise consists, in part, of excitation light scattered from the substrate itself as well as from surface and bulk contaminants. Scatter intensity varies with the characteristics of the substrate. Membranes are generally opaque and therefore scatter nearly all the excitation light. Agarose gels are translucent, scattering a fraction of the incident excitation light. Polyacrylamide gels are very clear and exhibit the least scatter. The scattered light component of background noise can consist of elastic scatter at the same wavelength as the incident light and Raman (inelastic) scatter that is red-shifted due to interaction between incident light and vibrating hydrogen-oxygen bonds of water in the substrate. Elastically-scattered light is largely blocked by an emission filter, but it can induce fluorescence in the filter itself which cannot be distinguished from signal fluorescence. Raman scatter often overlaps the emission spectrum of the fluorescent dye, thereby making it past the emission filter. Other significant components of background noise include fluorescence from unbound dyes and autofluorescence of the spectral filter and glass or plastic substrate materials. The foregoing components of background noise are considered to be non-random signals and cannot be removed by conventional signal-averaging techniques.

Therefore, there is a need in the art to provide a high-throughput image scanning device that produces high sensitivity and low background noise fluorescent images, thereby increasing the information content in an image for a given amount of nucleic acid or protein material. Ideally, the device would suppress undesired non-random signals to such a degree that faint fluorescence signals could be imaged even on opaque, scattering, or highly auto-fluorescent substrates.

SUMMARY OF THE INVENTION

The present invention provides a scanning apparatus and methods to obtain automated, rapid and sensitive scanning of substrate luminescence (fluorescence, phosphorescence, chemiluminescence, nano-particle emission, etc.), optical density or reflectance. The scanning apparatus employs moving-beam excitation to rapidly measure samples on or in a variety of substrates, including fluorescently-stained gels, silver-stained gels, developed x-ray films, storage phosphor screens, membranes, multi-well plates, petri dishes, glass and plastic surfaces, silicon chips and other emitting, reflecting or scattering substrates. The scanning apparatus employs a constant path length optical train to achieve highly uniform images with a minimum of optical complexity and no need for focus adjustment for a variety of substrates with widely-varying shapes, sizes, thicknesses, and optical characteristics. The constant optical path length also facilitates the use of phase sensitive signal processing. A method is provided for the use of phase nulling, either electronically or by a combination of electronics and software, to eliminate non-random baseline components and thereby enable the use of signal averaging to improve the signal-to-noise ratio. A method is further provided to allow the use of phase-sensitive detection for the improved discrimination of multiple dye fluorescence signals in the same substrate on the basis of their excited-state lifetimes.

The constant path length optical train of this invention is used to direct light onto and collect light from a substrate. It comprises a light source, a scanning mirror to receive light from the light source and sweep it across a steering mirror, a steering mirror to receive light from the scanning mirror and direct it to the substrate, whereby it is swept across the substrate along a scan arc, a waveguide or mirror to collect the optical signal, and a photodetector to receive emitted or scattered light from the substrate, wherein the optical pathlength from the light source to the photodetector is substantially constant throughout the sweep across the substrate.

The scan mirror preferably has one or more flat surfaces and is mounted on a scanning motor to rotate the mirror and thereby scan the reflected beam. Although the rotation can be oscillating, it is preferably unidirectional and at constant speed and therefore produces a constant angular sweep and constant incident optical power on the substrate per unit time. The scanning mirror can alternatively be curved, thereby simultaneously providing beam movement and focusing. In a first embodiment, the mirror has a single flat reflecting surface at the axis of rotation. Placement of a single reflecting surface at the axis of rotation prevents any path length variation arising from translation of the reflecting surface during rotation. For a 22.5° physical sweep of a single reflecting surface, corresponding to a 45° optical sweep employed in the first embodiment, the illumination duty cycle is only 1:16.

In a second embodiment the mirror is multifaceted, having a plurality of reflecting surfaces. The mirror can be a polygon centered at the axis of rotation. In a preferred embodiment, the polygon has 16 sides, each side providing a 22.5° physical sweep. The polygonal mirror increases the duty cycle by a factor of 16. The number of sides can be selected in accordance with the sweep angle and data acquisition electronics of the particular embodiment to optimize the duty cycle. However, since each surface of the polygon is displaced from the axis of rotation, the path length varies over the course of the scan. This variation in path length is a small percentage of the total path length, about one millimeter out of over 300 mm in a tested embodiment. At the operating frequency of the phase sensitive electronics in the tested embodiment, the phase shift caused by this path length variation is below the detection limit of the scanner. In this system a 1° phase shift is detectable, which corresponds to over 5 mm path length difference. The term "substantially constant path length" refers to a path length wherein the variations produce a phase shift which is too small to interfere with signal detection and analysis, and more preferably is below the detection limit of the scanner. At higher operating frequencies, the phase variation caused by the faceted mirror may be detectable, but is deterministic, allowing it to be corrected by a software analysis of the signal.

The steering mirror is preferably curved with a radius of curvature equal to the distance between the scanning mirror and the steering mirror and preferably between about 2 times and about 5 times the width of the substrate, thereby producing a constant optical path length and a constant plane of focus. This gives the steering mirror a cylindrical curvature and produces a correspondingly curved scan arc. Since the steering mirror is preferably beveled at approximately 45° to direct the light at normal incidence or beveled at approximately 73° to direct the light at Brewster's angle, the mirror is a conic section.

The optical train can further include a waveguide to collect emitted or scattered light from the substrate and direct it to the photodetector. To maintain the constant path length and uniform collection efficiency, the waveguide is preferably curved at the collection end to match the curvature of the scan arc. For a single photodetector, the waveguide is preferably wedge-shaped, tapering toward the photodetector end. The waveguide is preferably beveled at the collection end to couple light in and beveled at the detection end to reflect light into the photodetector. There is a range of internal reflection paths which can be followed to couple light from the substrate to the photodetector, with a corresponding range of path lengths. However, the waveguide and photodetector dimensions are selected so that the path length is substantially constant.

The waveguide can be shaped to provide one-dimensional confocal imaging of the excitation spot. In conventional confocal imaging, crosstalk is minimized by forming an image of the excitation spot on a pinhole aperture placed between the substrate and the photodetector using imaging optics which move along with the excitation beam. Scatter from neighboring pixels is blocked by the pinhole. Confocal imaging increases spatial resolution and reduces scatter crosstalk at the cost of increased optical complexity and reduced scan speed. In the scanner, one dimensional confocal imaging can be achieved using a waveguide with a curved collection edge rather than a flat bevel. The edge profile is an off-axis parabolic section with a focal point coincident with the illumination spot. The reflection characteristic of a parabolic section causes rays emanating from the illumination spot to be reflected into the plane of the waveguide, parallel to one another. Rays from pixels located adjacent to the excitation spot are not transmitted in the plane of the waveguide. In lieu of or in addition to a 45° bevel at the detector end, a cylindrical focuser, e.g., a curved waveguide edge, a lens or a mirror, is used to focus the rays into a line. The lens can be integral to or external to the waveguide. A slit is used to select only those rays in the line which originate from the illumination spot, and thereby block crosstalk. The detector aperture can function as the slit.

Confocal collection can also be achieved through the use of an off-axis parabolic collection mirror in place of the waveguide. To maintain the constant path length and uniform collection efficiency, the collection mirror is preferably curved to match the scan arc. Rays emanating from the illumination spot are reflected parallel to the plane of the scanner platform and are directed towards the detector. Rays from adjacent pixels are reflected out of the plane and either absorbed by the surrounding structure or the slit aperture, never reaching the detector. In the embodiment employing a parabolic collection mirror, there is no need for the waveguide since parallel rays originating from the illumination spot do not require internal reflection to reach the detector. The use of reflective collection optics rather than transmissive collection optics eliminates many restrictions on the wavelengths of light which can be employed in illumination and detection. For example, the use of a collection mirror allows the imaging of storage phosphor plates based on their 390 nm phosphorescence emission. The acrylic waveguide of the tested embodiment cannot be used in this application because the material absorbs all light below 400 nm wavelength. This signal would otherwise require a glass waveguide, which transmits wavelengths as short as 300 nm. Similarly, a scanner employing a collection mirror can be used to measure DNA concentration directly in gels via the characteristic DNA absorbance of 260 nm wavelength light. Even a glass waveguide would absorb this signal, requiring use of silica or another expensive and difficult to fabricate waveguide material.

Although it is preferred that both the path length from the light source to the substrate and from the substrate to the detector be constant, it is sufficient that the path length from the light source to the detector be constant. This can be accomplished with a flat steering mirror by configuring the collection optics, and in particular the waveguide, to compensate for path length differences introduced by the illumination optics.

The optical train can include additional beam shaping and directing elements. There can be a beam expander and a focusing mirror or lens. The optical connection between the light source, the scanning mirror, the steering mirror, the substrate and the detector can include mirrors which redirect the path without substantially changing the beam characteristics. There can be spectral filters between the detector and the waveguide or collection mirror.

This invention further comprises a scanner comprising the optical train in combination with a substrate holder. The scanning mirror provides scanning in one dimension. For substrates requiring two dimensional optical images, for example slab gels, the substrate holder can be a substrate translator. The substrate is translated in one dimension while the scanning mirror scans the beam in a second, preferably substantially orthogonal, dimension. The term "substantially orthogonal" is used because the scan arc is curved. In the preferred embodiment the steering mirror is curved and the substrate is flat. In lieu of or in addition to the curve in the steering mirror, the substrate itself can be curved to provide a constant optical path length. For example, if two-dimensional scanning is accomplished using a substrate translator, the steering mirror can be flat and the substrate can be cylindrical. For two-dimensional scanning without a substrate translator, the steering mirror can be enlarged to allow beam translation over an area. In this case, a motor rotates the scan mirror in one axis while a second actuator pivots the entire scan motor/mirror assembly. With flat substrates, the steering mirror curvature must compensate for the path length change induced by the pivoting scan mirror assembly. Conversely, a flat steering mirror can be employed with a curved substrate.

For high throughput automated operation, the substrate translator is preferably a conveyor belt. This invention provides a high throughput scanner wherein substrates are loaded onto the conveyor belt from a tray feeder. The scanner can further include a sample preparation apparatus such as a sample loader, a gel stainer and integral electrophoresis apparatus. The scanner can further include an apparatus for extracting sample fractions from the gel, multi-well plate, petri dish, membrane, or other substrate. When the scanner detects a band of interest, the sample extractor can be moved into position to remove a sample by excising that section of the substrate or by freeing the sample from the substrate by physical, chemical, electrical, or other means.

Because the optical path has a constant length, phase sensitive detection (PSD) can be used to distinguish multiple luminescent sources with different excited-state lifetimes and/or minimize undesired signal components. The excited-state lifetime of a luminescent species introduces a time delay between the absorption of exciting light and the emission of fluorescence, phosphorescence, or other optical signal. This temporal information can be useful in distinguishing desired luminescence from scattered light and non-probe luminescence. In PSD, the light source intensity is modulated, preferably sinusoidally. The luminescent emission is, in turn, modulated at the same frequency. The time delay between excitation and emission creates a phase shift between scattered and emitted light. By the use of both spectral and temporal information, the discrimination of signal components is improved, increasing the signal to noise ratio of luminescence images and increasing the flexibility of multicolor systems.

This invention provides a PSD scanner comprising the constant path length optical train with an intensity modulated light source. The light source can be modulated internally, for example by varying the current supplied to a diode laser, or externally, for example by an acousto-optic modulator. It is preferred that the circular frequency of the modulation be the reciprocal of the dye lifetime, resulting in a phase shift of 45° between the excitation and emission light. Modulation frequencies are typically between 1 and 100 MHz. The scanner also comprises phase-sensitive detection electronics to distinguish between the baseline signal and one or more luminescent signals based on the phase difference. The phase-sensitive detection electronics can comprise a frequency mixer which multiplies the signal input from the photodetector with a reference input. The reference input can be driven by the light source modulator, by a photodetector receiving a portion of the modulated light, or by a signal generator. The mixer is followed by a low-pass filter which demodulates the two inputs. Either the in-phase or quadrature channel of a lock-in amplifier can also provide these functions. The phase-sensitive detection electronics can also include additional signal processing elements such as amplifiers, filters and buffers.

In a preferred embodiment of the PSD scanner, phase nulling is used to reduce non-random components of the baseline signal arising from sources such as elastically scattered excitation light, Raman scattered light, fluorescence from unbound dye, and fluorescence from the emission filter and substrate. One embodiment of the phase-nulling system comprises a demodulator circuit or one leg of a quadrature lock-in amplifier, which functions as a demodulator, and further comprises a reference signal phase adjuster. The output of the demodulator is proportional to the cosine of the phase difference between the detector signal and the reference signal. The detector and reference signals are input to the demodulator circuit and the reference phase is adjusted so that it is 90° out of phase with the baseline signal, thereby nulling it completely. The reference signal comes from an RF signal generator phase-locked to the light source modulator. The signal generator is used as a phase adjuster to add or subtract phase delay from the modulated excitation waveform. Before scanning the substrate for an image, the reference phase is calibrated, typically manually, to null the baseline signal in a region of the substrate known not to contain any signals of interest. Luminescence signal components in the substrate image which are out of phase with the baseline signal are only partly attenuated by the phase-nulling system. Minimum attenuation of the luminescence signal occurs when there is a 45° phase shift between the luminescence and baseline components.

In a second embodiment of the phase-nulling system, phase nulling is accomplished mathematically in software. The phase-sensitive detection electronics utilize both the in-phase and quadrature demodulation legs of a lock-in amplifier. The reference source does not require a phase adjustor because of the quadrature splitting of the reference signal in the lock-in. Using a computer-implemented method for phase nulling, for which the relationships are provided herein, the phase shift of the luminescence signal is obtained from the in-phase and quadrature outputs of the phase-sensitive detection electronics. Phase nulling in software is particularly useful for substrates having more than one fluorescent dye or for which it is impractical to manually adjust the reference signal in the first embodiment.

Phase nulling removes the non-random baseline noise and leaves primarily random noise. While signal averaging is ineffective in reducing constant baseline noise, it can reduce the random noise which remains after phase nulling. The phase-nulling PSD scanner can further comprise a signal averager. The averager can operate in a variety of ways. In one method, the speed of the scanner is reduced so that multiple sequential measurements of each pixel are averaged over time. In a second method, the scanner makes multiple high-speed sweeps over each scan line in the substrate. The scans are accumulated and each pixel in the scan line is averaged by the number of passes. In a third method, the scanner traverses the entire substrate multiple times and accumulates the images. Each pixel value is then averaged by the number of images accumulated. In scanner embodiments employing multiple scan mirror facets, averaging speed can be increased due to the higher duty cycle of data acquisition.

In addition to reducing non-random noise in luminescence images, phase nulling can be employed to enhance discrimination between multiple luminescent sources in the same image. Multi-dye imaging is highly useful for such things as DNA sequencing, where a different fluorescent dye is used to label each of the four species of nucleotide and one or more additional dyes may be used to define an electrophoresis lane. In conventional DNA sequencing instruments, the multiple dyes are discriminated on the basis of their emission spectra. The wide spectral range encompassed by the dye set makes it difficult to efficiently excite all the dyes with a single laser, requiring multiple lasers per instrument or drastic dye concentration differences and/or expensive hybrid dyes which use resonant energy transfer to partially normalize excitation efficiency in single laser instruments. Regardless of the means of excitation, emission spectral overlap between the dyes gives rise to channel crosstalk, reducing discrimination. These problems can be avoided by employing multiple phase-nulling circuits, each tuned to null a single signal component. In the case of four-color DNA sequencing, four nulling circuits are used with four separate reference phase delays.

In one implementation, all four dyes have similar spectral characteristics but different excited state lifetimes. Each reference signal nulls the fluorescence from one dye. The identity of each signal peak is then determined by the presence of partially-attenuated signal peaks in three channels and complete nulling in the remaining channel. In a second implementation, the dyes are paired into two spectral classes that are comparably well-excited by a single laser. Within each spectral class, the dyes have different excited state lifetimes. Multiple phase-nulling circuits, one per excited state lifetime, are used as in the first implementation to separately null the dye signals. Multiple emission filters are used to discriminate dyes which have similar excited state lifetimes but different spectral classes. Both implementations can employ either the manual nulling method or the software-based nulling method, described above.

This invention provides a method of noise reduction in the detection of modulated luminescence comprising the steps of demodulating the detected signal using a phase-labile reference signal, phase nulling the detected signal to reduce non-random noise, and signal averaging to reduce random noise. The phase nulling can be performed electronically or in software, as described above.

This invention further provides a computer-implemented method and apparatus for phase nulling, comprising a lock-in amplifier to obtain the in-phase and quadrature demodulated outputs from a signal and a reference input of arbitrary phase, and a computer to obtain the phase via the relationships provided herein.

This invention further provides a method of signal discrimination for use with multiple sources of modulated luminescence, comprising the steps of phase nulling each luminescence signal source and determining the identity of a signal component based on the presence of signals in all but one phase nulling circuit.

This invention further provides a multiple image-type scanner. The scanners described above can be adapted for use with a variety of image types, including fluorescent gels, silver-stained gels, developed x-ray films, storage phosphor screens, membranes, multi-well plates, and other emitting, reflecting, transmitting or scattering substrates. The multiple image-type scanner has a plurality of light sources and/or a removable diffuse reflector. The type of light source, the spectral filters, and the use of a diffuse reflector are interchanged according to the image type. For measuring images on reflective substrates, for example a black and white photograph, light is absorbed in some portions and reflected in others. By detecting the reflected light, the image can be reconstructed. For measuring optical density of transmissive substrates, for example x-ray films, a diffuse reflector is positioned behind the substrate as a scatter source. At high optical density the light is absorbed by the film and not scattered back to the detector, while at low optical density it is transmitted through the substrate, scattered by the diffuse reflector, transmitted again through the substrate, and detected by the photodetector. For detection of emitted light the diffuse reflector is removed. For fluorescent images, the light source is preferably an argon ion laser. For phosphor screens, the light source is preferably a helium-neon laser.

The several aspects of this invention can be used separately or in combination to provide high throughput and high sensitivity analysis of substrates.

All references cited herein are incorporated herein by reference in their entirety.

BRIEF DESCRIPTION OF THE DRAWINGS

FIG. 1, comprising

FIG. 4, comprising

FIG. 7, comprising

DETAILED DESCRIPTION OF THE INVENTION

Figure 1A:
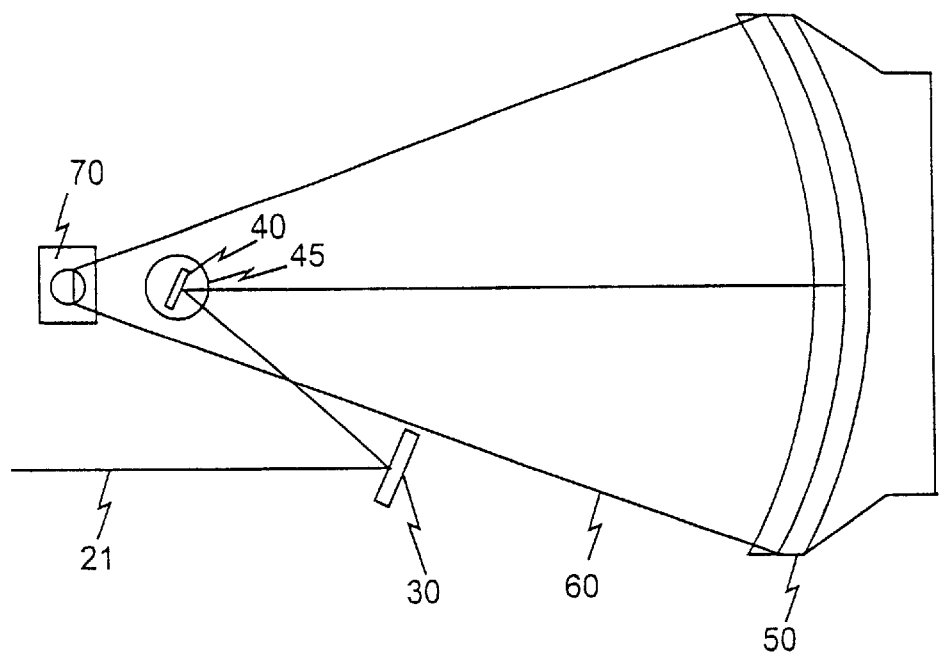
FIGS. 1A–B, is the constant pathlength optical train in (A) top view and (B) side view.

The constant path length optical train comprises an excitation system and a detection system, as illustrated in FIG. 1. The excitation system consists of a light source (not shown) which produces light beam 21, optional focusing mirror 30, or cylindrical focusser scanning mirror 40 and steering mirror 50. The detection system comprises waveguide 60 and detector 70 equipped with an aperture 72 which may be a slit. In the illustrated embodiment, the optical train is mounted on deck 10. A description of a preferred embodiment for two dimensional scanning of a gel on a glass plate follows. In this description, positioning of elements, e.g., "between," refers to optical positioning rather than physical positioning unless otherwise specified. There can be additional optical elements between a first element and a second element which receives light from the first element. Likewise there can be additional elements between a first element which sweeps light across a second element and the second element.

In the preferred embodiment the light source is an air-cooled 75 mW argon-ion laser that produces a linearly polarized beam of 488 nm light, 0.8 mm in diameter ($e^{-2}$ cutoff). The beam passes through a telescopic expander (not shown) consisting of an f=−25 mm plano-concave lens and an achromatic cemented doublet with f=75 mm.This combination forms a 3X beam expander that is only 50 mm in length, can handle very high power densities due to its virtual focus, and has diffraction-limited performance. The 2.4 mm diameter beam that exits the telescope is reflected by concave focusing mirror 30 towards the rotating scan mirror. The concave mirror has a focal length of 500 mm and is positioned such that the beam waist lies within the plane of the gel. Although any focusing element can be used, the use of a focusing mirror rather than a lens prevents changes in spot size due to dispersion if different wavelengths are employed. This optical system produces a spot size of 65 microns and a depth of focus of 4.4 mm.

The focusing mirror reflects the beam onto rotating scan mirror 40. The scan mirror is 12.5 mm square and its axis of rotation is 300 mm from the scan arc. The mirror is mounted on scanning motor 45 to form a mirror assembly. The motor rotates unidirectionally, scanning the beam over the 45° data-collection arc. Because the optical sweep of the beam is twice the physical sweep of the mirror, the beam translates across the gel with a mirror rotation of 22.5°, resulting in a duty cycle of 6.25%. The duty cycle can be increased by using a multifaceted mirror, for example a polygon. The scanning beam moves through a plane parallel to and one inch below deck 10.

A unique feature of this constant path length design is the configuration of steering mirror 50, which directs the beam towards the gel. The mirror has a cylindrical cross section. For 90° reflection, it consists of a diamond-machined 45° conic section designed so that no matter what the scan mirror position, the beam will intersect the steering mirror 300 mm away and be directed upwards at 90° out of the plane of the scan. Since the reflection of the beam always takes place at the same distance from the scan mirror, the focal point does not shift vertically as the spot moves across the gel. As a result, the optical resolution of the scanner is not a function of the beam position. Additionally, by eliminating the transformation of the rotary scan to linear spot motion, the velocity of the spot remains constant across the gel, resulting in a constant pixel size and uniform excitation photon dose over the image.

Figure 2:
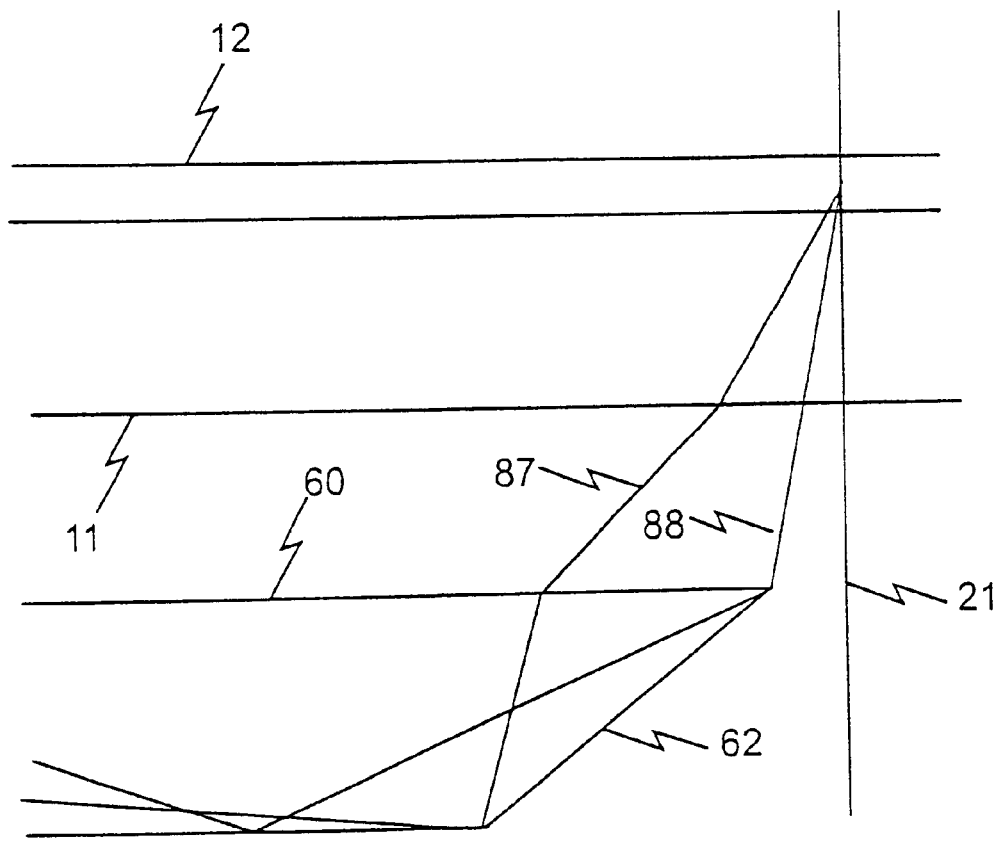
FIG. 2 illustrates the total internal reflection in the vertical plane within the collection waveguide.
Figure 3:
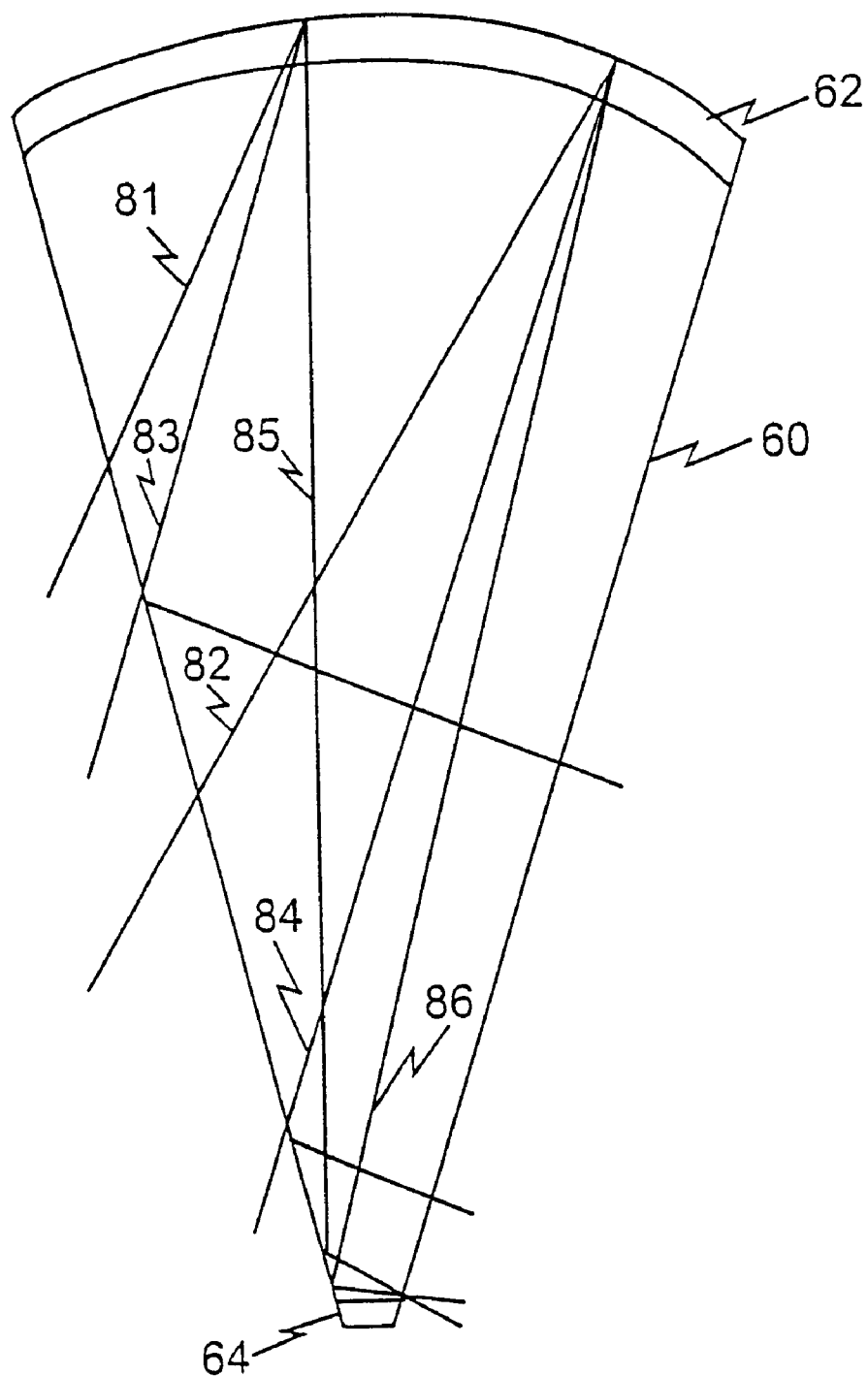
FIG. 3 illustrates the total internal reflection in the horizontal plane within the waveguide.

The emitted or scattered light from the object being scanned can be collected by a waveguide 60 that lies between the deck and the substrate being scanned. The collection process from gels is illustrated in FIGS. 2 and 3 for a non-confocal waveguide. The term substrate refers to the object being scanned. For gel images the substrate comprises both gel 12 and rigid support 11, typically a glass plate. Waveguide 60 is in the shape of a wedge having a collection end and a photodetector end. The collection end 62 is the wide end of the wedge and the photodetector end 64 is the narrow end. Light is directed from the collection end to the detection end via total internal reflection. The collection end matches the curvature of the scan arc so the edge of the waveguide is a constant distance from the beam spot. This edge 62 is beveled at 30° so that light from just above the glass is efficiently coupled into the guide. The thicknesses and refractive indices of the elements determine the collection geometry. The gel 12 typically has n=1.33 and thickness 1.0 mm. The glass 11 has n=1.515 and thickness 3.5 mm. The air gap has n=1.00 and thickness 4.5 mm. The wedge 60 is acrylic with n=1.49 and thickness 6.35 mm.

The collection efficiency of the system employing the non-confocal waveguide is dictated by two factors. Collection in the vertical plane is illustrated in FIG. 2. First, rays of light emanating from the intersection point of the laser and gel at angles of less than 13.6° cannot be reflected by the 30° bevel of the waveguide due to the critical angle for total internal reflection in acrylic. As a result, the laser beam can be offset from the edge of the waveguide by about 2.5 mm while still being able to capture the 13.6° luminescence outer ray 88 without any loss in collection efficiency. The offset is useful to ensure that there will be no intersection between the beam and the waveguide, which could result in autofluorescence of the acrylic and an increase in the baseline signal. The second factor is that the gel itself will capture by internal reflection any fluorescent ray with an angle greater than 48.75°, illustrated by inner ray 87 in the diagram. This constraint means that a waveguide thickness of ¼" is sufficient to capture any ray emitted towards the waveguide that can escape the gel's internal reflection, about 10% of the total emission. In the horizontal plane, the geometry of collection is illustrated by FIG. 3.

Light collected may launch into the waveguide at any angle. Rays are traced for two points on the scan arc, one in the center and one toward the right side. Light that strikes the sides of the waveguide at a narrow angle like rays 81 and 82 will be beyond the critical angle of internal reflection and will escape. Light that strikes more obliquely than rays 83 and 84 will meet the internal reflection criterion but will escape from the waveguide's other edge due to its near-normal incident angle. Only light that is more oblique than rays 85 and 86 will be able to strike the rear reflecting facet and be directed into the detector. For the light collected toward the side of the scan arc there is only a slight decrease in the angle of acceptance compared to the center, as indicated by the proximity of the reflection points of marginal rays 85 and 86. The insensitivity of the angle of acceptance to the position in the scan arc results in a very even collection efficiency over the entire scan. The positional insensitivity comes at the price of low collection efficiency in the horizontal plane (roughly comparable to a camera), since only rays that propagate nearly directly from the collection point to the rear facet are detected. Despite this, the overall collection efficiency is higher than a camera system due to the high collection efficiency in the vertical plane. In the prototype, the 10% vertical collection efficiency figure is not achieved due to unsilvered rear 45° facet 64, which can only reflect into the detector those rays incident at less than the critical angle. Collection efficiency can be improved by silvering the rear 45° facet and increasing the width of the detector's sensitive area to maximize the acceptance angle. Silvering the sides of the waveguide would not significantly increase collection efficiency since the tapered shape would reflect most rays towards the front of the waveguide after only two or three bounces.

From the waveguide, the light passes through a chromatic filter before striking a Hamamatsu 5783-01 integrated photomultiplier 70. The chromatic filter is custom fabricated and consists of a 3 mm thick plate of Schott OG 515 glass that is coated with a 515 long-pass dielectric layer for additional laser rejection. Though a dielectric filter is not preferred for use as the sole chromatic filter due to the variable incident angle of the light, the dielectric coating over the bulk filter blocks a large fraction of the scattered laser light before it reaches the OG glass. This reduces the intrinsic fluorescence of the filter to a level comparable to a KV550 filter but with the OG filter's 35 nm extended passband.

The gel transport, excitation, and collection systems are assembled on chassis plate 10. It consists of an aluminum deck, approximately 600 mm×300 mm×12 mm in size. The plate contains a scan aperture slot to allow transmission of the laser beam and a round detection aperture to allow light to reach the photodetector. The scan aperture is a 10 mm wide arc centered on an index point 300 mm towards the excitation end of the deck. The scanning mirror provides scanning in one dimension. To provide scanning in a second dimension, the scanner includes a gel transport system integral to the deck. The gel translator comprises two belts driven simultaneously by a single shaft. The shaft is connected to a motor by a timing belt. Idler pulleys support the belts along the length of the deck, and another solid shaft with fixed pulleys at the opposite end of the deck prevents the belts from slipping or stretching relative to each other. Cut into the underside of the deck are V-grooves and slots to accommodate the axles for the idler pulleys. The pulleys form two rows spaced 230 mm apart, parallel to the long axis of the deck. This spacing places the belts far enough apart to support the gel's glass substrate while allowing the laser to scan the entire width of the gel. The axles are on 100 mm centers so the substrate is always supported by at least two pulleys per side over the course of its travel through the scanner, preventing belt sag under the weight of the gel plate.

The optical resolution of the high throughput scanner was tested by removing the laser blocking filter and scanning a series of narrowly-spaced lines printed on a sheet of paper. Three rows of lines were used of approximately (a) 500 microns in width or 1.0 line pairs per millimeter, (b) 250 microns line width (2.0 lp/mm) and (c) 125 microns (4.0 lp/mm). The modulation or contrast of the system can be defined as $$M_O = \frac{signal_{max} - signal_{min}}{signal_{max} + signal_{min}} \quad (1)$$

When the contrast of the detected signal from the target is compared to the signals from pure black and white reference levels (taken from the lowest resolution target), a contrast ratio or modulation transfer function (MTF) can be plotted for the three patterns of increasing frequency.

Figure 4A:
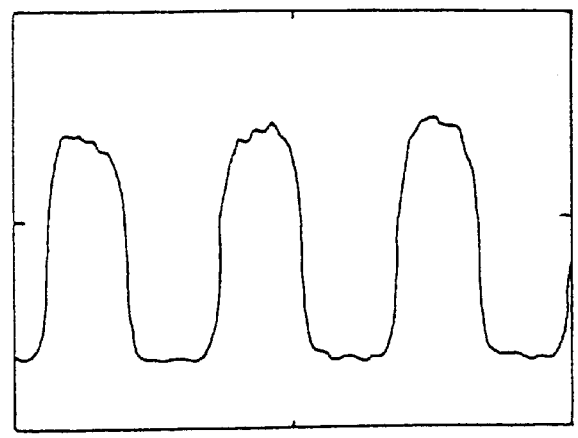
FIGS. 4A–D, shows the modulation transfer function of the scanner patterns with (A) one line per millimeter, (B) two lines per millimeter and (C) four lines per millimeter. The modulation transfer function as a function of spatial frequency is shown in FIG. 4D.
Figure 4B:
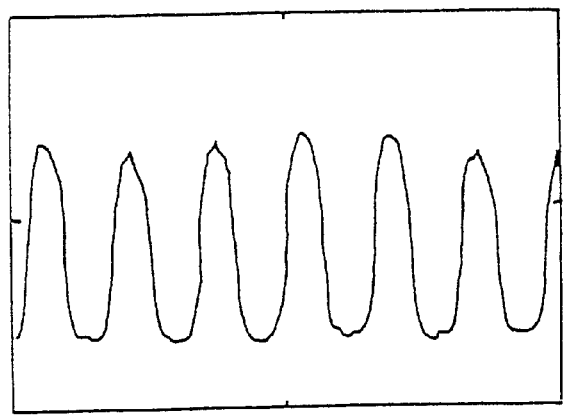
Figure 4C:
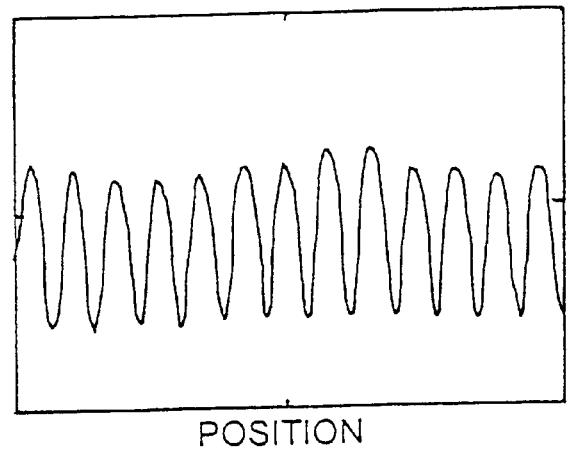
Figure 4D:
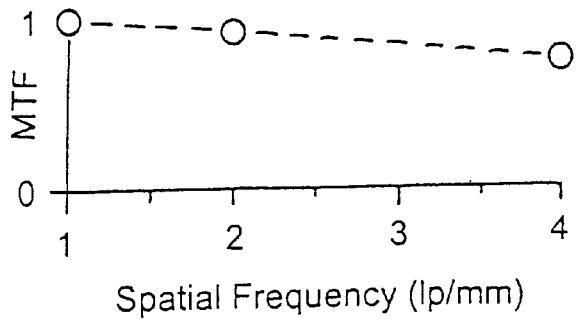

The target was placed at the center of the scan arc where the curvature was normal to the vertical lines and the signal recorded by an oscilloscope. For this target, scattered laser light, as opposed to fluorescent light, was detected. The data are shown in FIG. 4, showing signal contrast as a function of scan position for the (A) 1, (B) 2 and (C) 4 lp/mm test target. Using the average values of the peaks and troughs in the signals and normalizing by the black and white levels of the 500 micron target, the MTFs in order of increasing frequency were 1.0, 0.94, and 0.74, as shown in FIG. 4D. By convention, a contrast ratio of 2:1 is arbitrarily chosen as the minimum necessary to resolve two peaks in the scanned target. The corresponding MTF of this contrast ratio is 0.375. By this criterion, the scanner's optical performance exceeds the 4.0 line-pairs per mm resolution of the finest test pattern. Due to the resolution limitations of the available printers, finer test targets were not generated.

Because the conversion time of the A/D system determines the rate at which pixels are measured, the data acquisition electronics are the ultimate speed-limiting component of any gel scanner. While the performance of the optical system determines the limiting spatial resolution of the image, it is the data acquisition system that dictates the operating speed and practical resolution of the scanner. Data acquisition in the prototype scanner is triggered by a positional encoder on the scan motor. The encoder on the initial prototype produced 4,000 digital pulses per revolution in each of two channels. The pulse trains were 90° out of phase, resulting in 16,000 digital transitions per revolution of the scan motor, corresponding to 1,000 transitions over the 22.5° scan arc. Each of these 1,000 transitions triggered the digital conversion of two neighboring pixels using a dual A/D data acquisition system. An index pulse indicated when the beam was about to enter the scan area, enabling data acquisition. The scan motor rotated at ten revolutions per second, producing a 2,000-line by 2,000 pixel image approximately every 200 seconds. Due to the curved scan line, a train of samples stored in a linear array in the computer must be repositioned to take into account the transformation from cylindrical to rectangular coordinates. This transformation is invariant over time since the curve of the arc is a function of the shape of the mirror and the length of the scan radius.

In order to accurately sample the signal, the input to the digital system must be frequency-limited above the Nyquist frequency of half the sampling frequency. The maximum Nyquist frequency of the system is determined by the sampling rate of the analog-to-digital converter. With the prototype system, the sampling rate was 400 KHz and the Nyquist frequency was 200 KHz. The maximum spatial resolution of the sampling system can be found via the relation $$resolution = \frac{\omega r}{f_{Nyquist}} \qquad (2)$$

where r is the 300 mm radius of the scan from the point in the center of the scan arc and ω is the circular frequency of the scan mirror's rotation, 2 π times the number of revolutions per second. For a scan rate of 10 rps, the sampled spatial resolution is 95 microns. Higher spatial frequencies must be eliminated prior to digitization or they will be aliased down to lower frequencies, resulting in anomalous signals. Anti-alias filtering can be performed either optically, by defocusing the laser spot to match the sampled resolution, or electronically by low-pass filtering the signal below the Nyquist frequency. If higher spatial resolution is required, the scan rate can be slowed or multiple A/D converters can be multiplexed to sample the same signal at a higher effective rate. The high throughput scanner employs a data acquisition system that can multiplex up to 16 A/D converters. By using just two conversions per pixel, the sampled resolution can be increased to better than ten line-pairs per millimeter, exceeding the calculated resolution of the optics. The remaining channels can be used to increase the sampling rate, and therefore the imaging rate, by up to a factor of four. With the use of a 16-facet polygon mirror and appropriate changes in the scan motor speed, transport speed, and laser power, the high throughput scanner has the potential to scan with pixel sizes below 60 microns and scan rates far exceeding two gels per minute.

Figure 5:
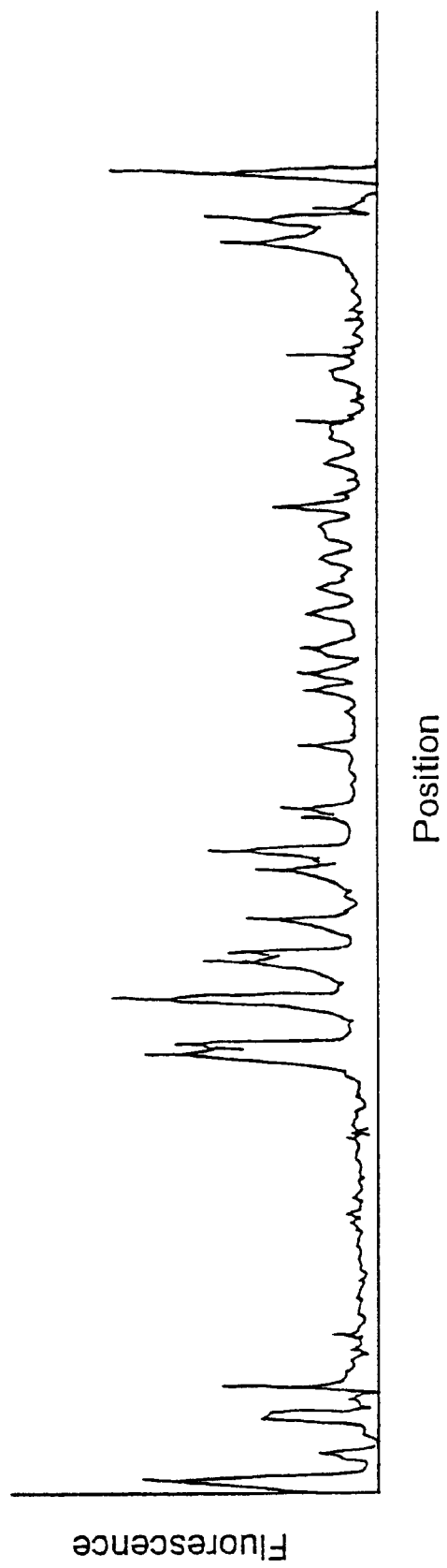
FIG. 5 is the fluorescence scan of a DNA gel.

The scanner was used to image fluorescent targets. A 1% agarose gel, 5 mm thick and containing DNA-fragment samples stained with SYBR Green was scanned and a two dimensional image created. The gel had ten sample lanes and the scan line ran across the sample lanes. The image along the length of the lanes was acquired by translating the substrate. In the image, the lanes are well-defined and the bands in each lane are clear. Speed variation in the prototype conveyor belt sample translator caused some lines to be compressed relative to others. FIG. 5 is the fluorescence intensity profile of one line in one lane of the gel. When the gain was adjusted to produce a maximum signal of about ¾ full-scale, the baseline level was about 1/20 full-scale for gels of similar thickness and agarose concentration.

The scan lines can alternatively be parallel to the lanes and the substrate can be translated to measure the different lanes. With this scanning geometry, two identical polyacrylamide 1-D protein gels were scanned at the same time. One gel was stained with SYPRO Orange while the other was stained with SYPRO Red. The two dimensional image clearly showed the lanes and bands. Speed variations caused image distortion and resulted in bands with zigzag profiles. Also evident in the image were many black spots, corresponding to surface digs in the particular glass plate used as a gel substrate in this scan. The surface irregularities caused laser light to be scattered directly into the waveguide, resulting in very sharp speckle artifacts. The elimination of such artifacts can be accomplished through the use of phase-sensitive detection, as described below.

The high throughput scanner of this invention has been shown to have speed and resolution comparable to, and a lower baseline level than, currently available commercial units. Further, it is amenable to high-throughput gel analysis by being able to load and unload many gels with minimal operator intervention and no interruption in scanning. Because the A/D electronics can be multiplexed with up to 16 channels and the scan mirror can be replaced with a 16-facet polygon, the scanner is potentially capable of imaging speeds that are an order of magnitude faster than existing commercial systems, combined with true, after-sampling spatial resolution exceeding eight line pairs per millimeter.

This invention further provides modulated excitation and phase-sensitive detection. With the replacement of continuous-wave excitation, the high-throughput scanner can image gels with much lower detection limits and fewer image artifacts than conventional high-speed fluorescence imaging allows. The increased sensitivity reduces the amount of sample which must be prepared for each gel, while the increased image quality increases the amount of useful data which can be obtained from an image and shortens the time it takes to process each gel image prior to further sample analysis. In fluorescence scanning the detector sees both dye fluorescence and noise. The noise in fluorescence intensity images has several sources. One source is the fluorescence due to unbound dye in the gel. Another source is the laser excitation light itself. This light scatters from the surface of the gel and its glass substrate into the detector. With turbid agarose gels, the gel itself can scatter a large fraction of the laser intensity. Regardless of the source of scatter, the attenuation of the excitation light by the chromatic filter can be very high but is necessarily imperfect. Even with very effective chromatic filtering, the excitation light that is absorbed by the filter can produce fluorescence of the filter itself. In addition, the laser light interacts with the water in the gel to produce Raman scatter. This inelastic scatter process results in light that is red-shifted from the excitation wavelength, often falling within the passband of the chromatic filter. The noise components cited above are primarily non-random in nature and therefore cannot be reduced by signal averaging.

This invention combines phase-sensitive detection with fluorescence scanning to reduce the non-random noise components. The non-random components result in both a high baseline signal and occasional signal spikes, corresponding to surface imperfections in the gel and glass substrate that efficiently scatter the laser light. The high baseline makes it difficult to distinguish small fluorescence signal peaks from variations in the overall baseline level, reducing sensitivity. The high mean value limits the dynamic range of the system and prevents the use of high-gain logarithmic amplifiers to detect faint fluorescence peaks. The scatter spikes complicate image processing steps that try to identify signal peaks. Phase-sensitive detection allows for phase-nulling of these non-random noise components. Not only does the phase-nulling dramatically reduce the overall noise level; it also transforms the remaining noise into a random component. As a result, all of the noise in the image is subject to reduction via signal averaging techniques. Phase-sensitive detection also provides a means to separate fluorescence signal components on the basis of their lifetimes, even if their spectra overlap. This capability allows the detection of fluorescence from multiple dyes in a single gel using a single detector and filter.

Figure 6:
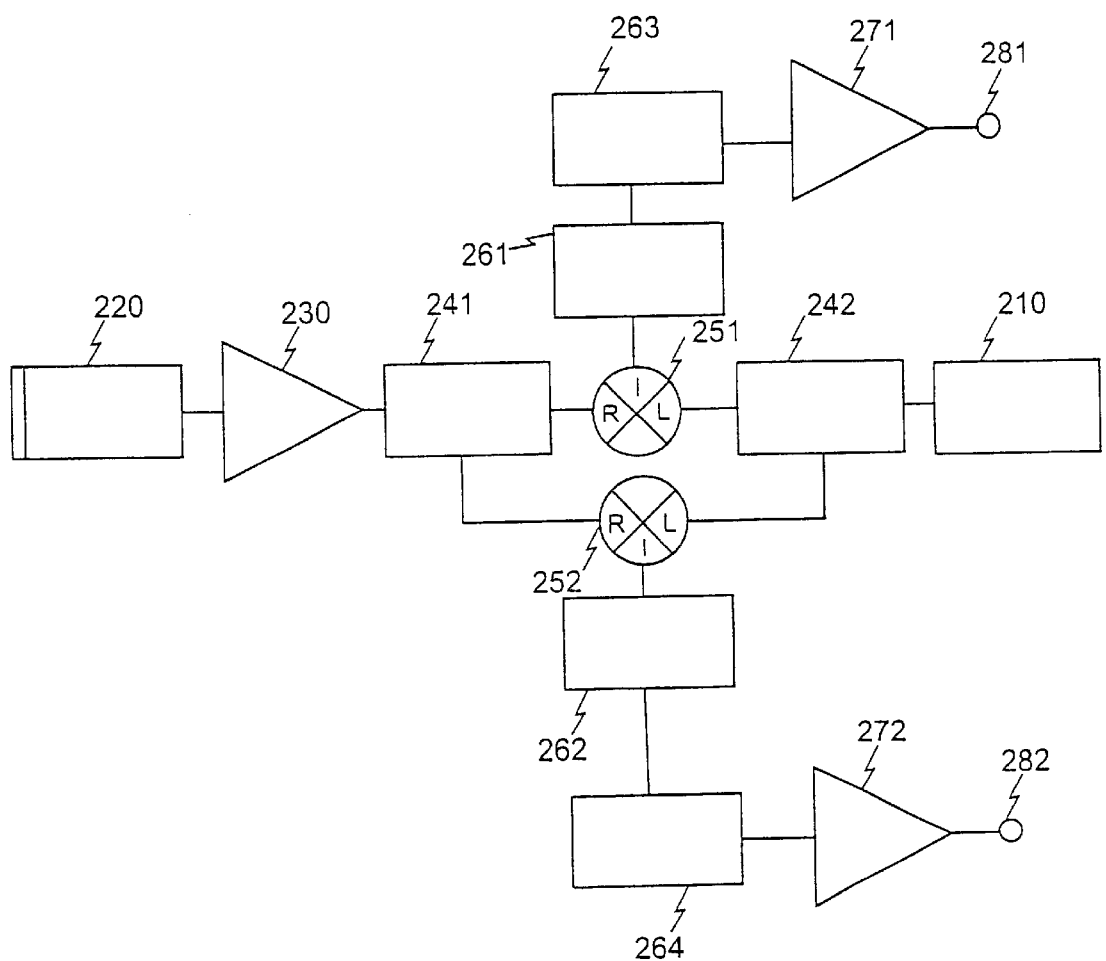
FIG. 6 is a block diagram of the lock-in circuit used for phase-sensitive detection.
Figure 7A:
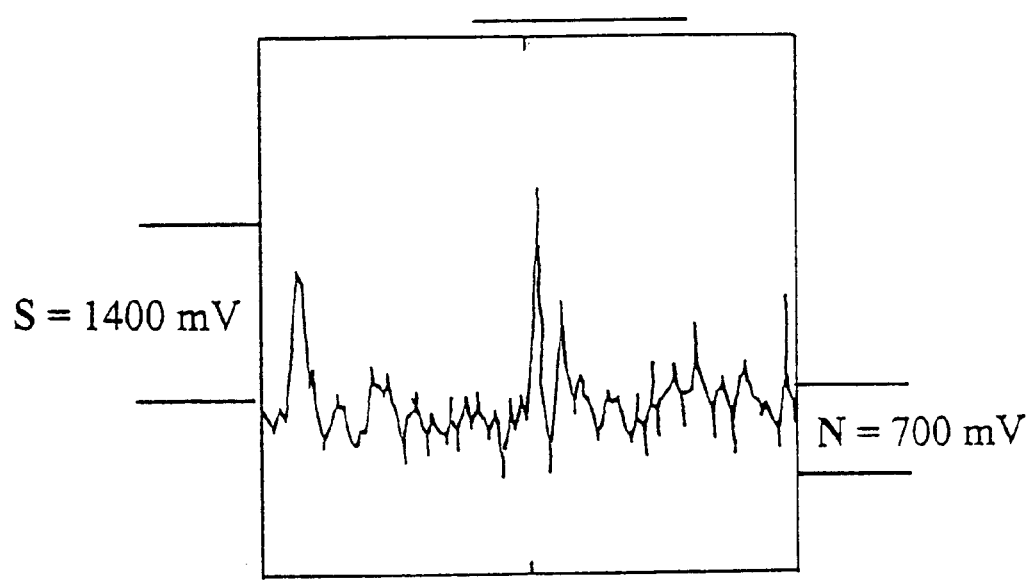
FIGS. 7A–E, shows phase-nulled fluorescence scans with increasing signal averaging for (A) a single scan, (B) 4 averages, (C) 9 averages, (D) 25 averages and (E) 100 averages.
Figure 7B:
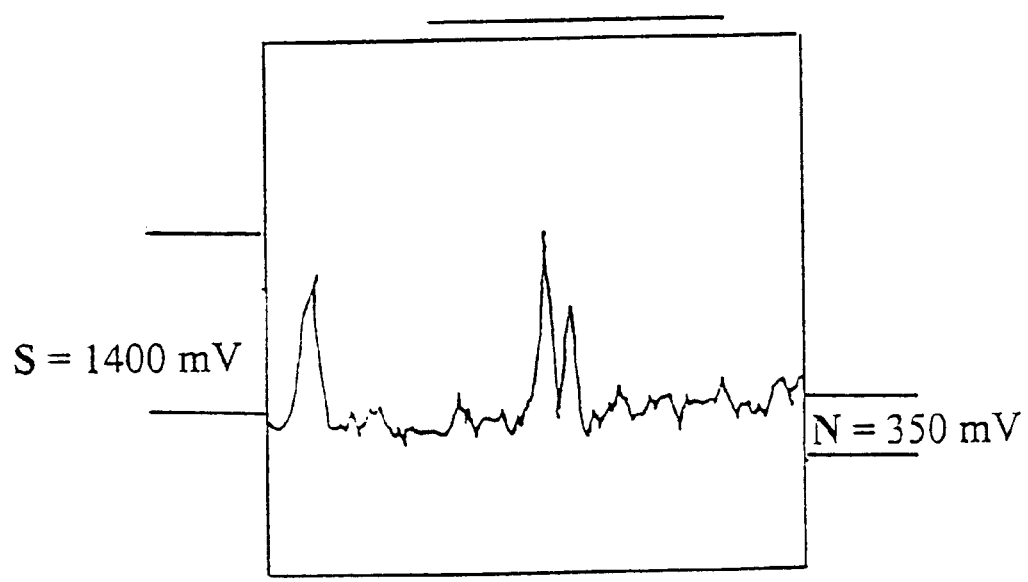
Figure 7C:
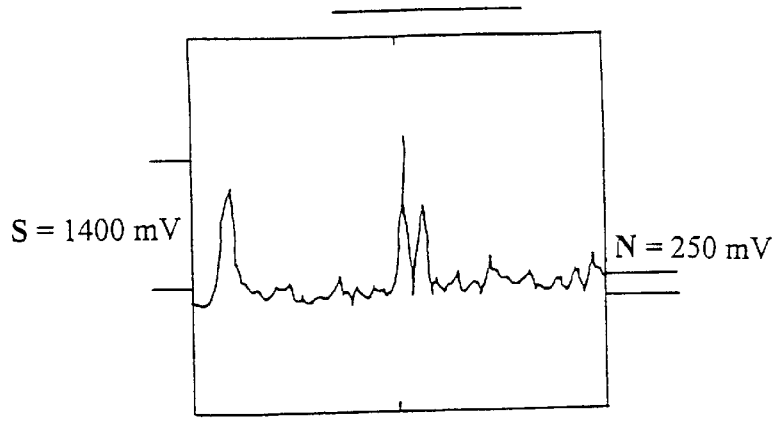
Figure 7D:
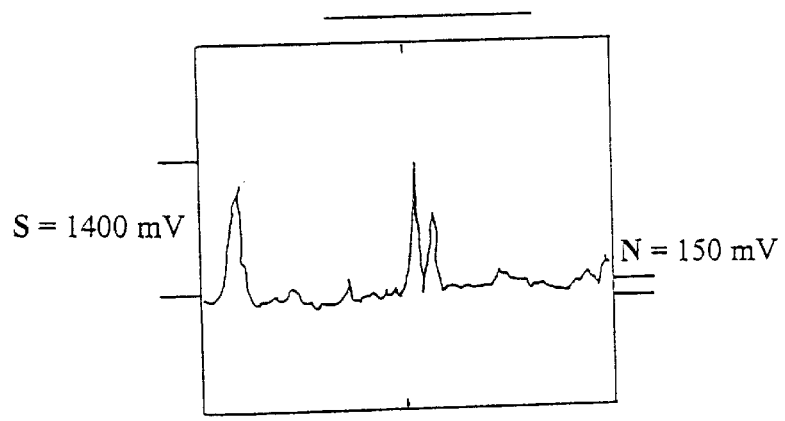
Figure 7E:
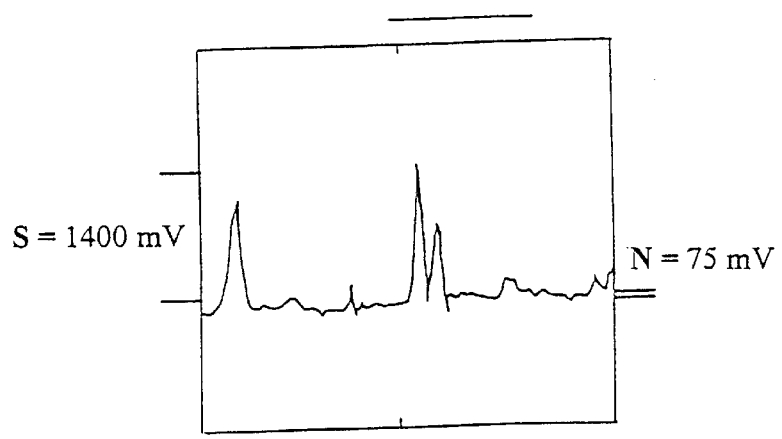

The lock-in detection electronics used for phase sensitive detection are illustrated in FIG. 6. The fluorescence input comes from photomultiplier 220 (Hamamatsu model H5783-1) in combination with preamplifier 230 (EGG 5185). The reference input is provided by RF source 210 (SRS DS345). The fluorescence input is fed into 0° splitter 241 (Mini-Circuits PSC-2-W) and the reference input goes into 90° splitter 242 (Mini-Circuits PQW-2-90), and then the split signals go into mixers 251 and 252 (Mini-Circuits SRA-1). The mixed signals are demodulated by low pass filters 261 and 262 (Mini-Circuits PLP-1.9) and 263 and 264

(Burr Brown UAF-42). The filtered signals are buffered by op-amps 271 and 272 (TI OP27). The in-phase output is at 281 and the quadrature output at 282. For electronic phase nulling the RF source includes a signal generator to adjust the phase delay, and only one leg of the lock-in is used. For mathematical phase nulling, the reference phase is not adjusted and both the in-phase and quadrature outputs are used.

When scanning, each pixel requires an independent phase and amplitude measurement at a rate of about 400,000 pixels per second. To prevent the carryover of information from one pixel to the next, the output filters of the lock-in have time-constants comparable to the pixel sampling rate, about 2.5 microseconds. The short filter time-constants mean that each leg of the lock-in behaves as a broadband demodulator. If the reference phase is adjusted so that one leg of the lock-in nulls the constant background signal, the remaining noise is stochastic and can be reduced by signal averaging. To implement phase-nulling, an RF signal generator is phase-locked to the laser modulator and is used to add or subtract phase delay from the modulated excitation waveform. Because of the short output filter time-constant, very little signal averaging takes place in the output filters. With a modulation frequency of 30 MHz, the output filter will average approximately 75 modulation cycles per pixel. As a result, signal averaging to reduce stochastic noise is preferably accomplished by repeated line scans and digital averaging.

After phase-nulling the mean value of the baseline is nearly zero, and the random signals that remain are the result of noise in the detector, amplifiers, and signal processing components. The zero mean value of the phase-nulled baseline results in a signal to noise ratio (SNR) that increases with the square root of the number of samples. This is demonstrated in FIG. 7. The scope traces represent averages of one (7A), four (7B), nine (7C), 25 (7D), and 100 (7E) scans. The steady baseline of continuous-wave scanning is replaced by random noise due to the phase-nulling process. Because phase-nulling of scatter replaces the constant baseline with random noise, the SNR of the system can be improved by taking advantage of signal averaging to increase the overall sensitivity of the gel scanner. As expected, the SNR increases with the square root of the number of averages up to about 100-fold averaging, beyond which the bleaching of the dye reduces the signal strength and the SNR below the theoretical value.

The effects of phase-nulling combined with signal averaging were seen in whole-image data as well. An agarose DNA-fragment gel stained with SYBR Green was scanned in three different ways. The image from a continuous-wave laser scan showed low overall signal strength. A single-pass phase-nulled scan showed the increased SNR that results from nulling the baseline scatter. In a phase-nulled scan with nine-scan averaging even the modest three-fold improvement in SNR was readily apparent as a reduced and more uniform background level detection. Far more faint DNA bands were detectable than was possible in continuous-wave scanning.

In addition to increasing the SNR of a scan relative to the baseline level, phase-nulling is effective at reducing the signals from small, highly scattering sources such as dust on the surface of a gel or small chips in the surface of the gel's glass substrate. A 2-D polyacrylamide protein gel stained with SYPRO Orange was scanned both with and without phase-nulling. The continuous-wave scan exhibited hundreds of scatter artifacts due to surface damage in the glass substrate as well as a high baseline level. The image scanned with phase-nulling reduced the scattering spots as well as the baseline. The technique is so effective because the nulling efficiency depends only on the phase of the scattered light, not its amplitude. Protein spots that were nearly invisible in the continuous-wave image were readily apparent in the phase-nulled scan, despite the fact that no signal averaging was employed. Such results show that the technique is also potentially useful for other high-baseline imaging tasks such as scanning probes on (highly autofluorescent) membranes or detecting the latent images of storage phosphor screens.

Continuous-wave fluorescent intensity scans of an agarose DNA mapping gel were obtained using the high-throughput scanner of this invention and a commercial gel scanner. Both images had similar spatial resolutions and signal to noise ratios, and both exhibited a combination of scatter and fluorescence peaks of varying intensity. The same gel was scanned using phase-sensitive detection on the high-throughput scanner. The phase was adjusted to result in a scatter null, which dramatically reduced the background level. The same gel was scanned with the phase adjusted to produce a null of the DNA fluorescence. Despite the wide variation in fluorescent band intensities across the gel, the null was virtually complete. This illustrates that the same gel can be scanned using various null phases to discriminate signal or noise components that have different excited-state lifetimes. This demonstrates that phase-sensitive detection can increase the number of fluorescent dyes that can be used in a single sample by discriminating signals on the basis of both their spectra and their excited-state lifetimes. This ability makes possible the use of the technique in DNA sequencing and other multi-color imaging tasks.

The phase nulling in the previous examples was accomplished electronically. At the beginning of each scanning session, the reference phase was manually calibrated to null the scatter signal in one leg of the lock-in electronics. Any signal that was detected in the gel was therefore phase-shifted from the null point. Because the phase nulling technique uses a standard demodulator circuit, it can be employed using either the quadrature or in-phase channel of a lock-in detector without the need for additional circuitry. Alternatively, the equivalent of phase nulling can be accomplished mathematically by employing both channels of the lock-in to gather the vector phase and magnitude of the signal. This information, along with foreknowledge of the lifetimes of the signal components, allows phase nulling by mathematically post-processing the data.

Figure 8:
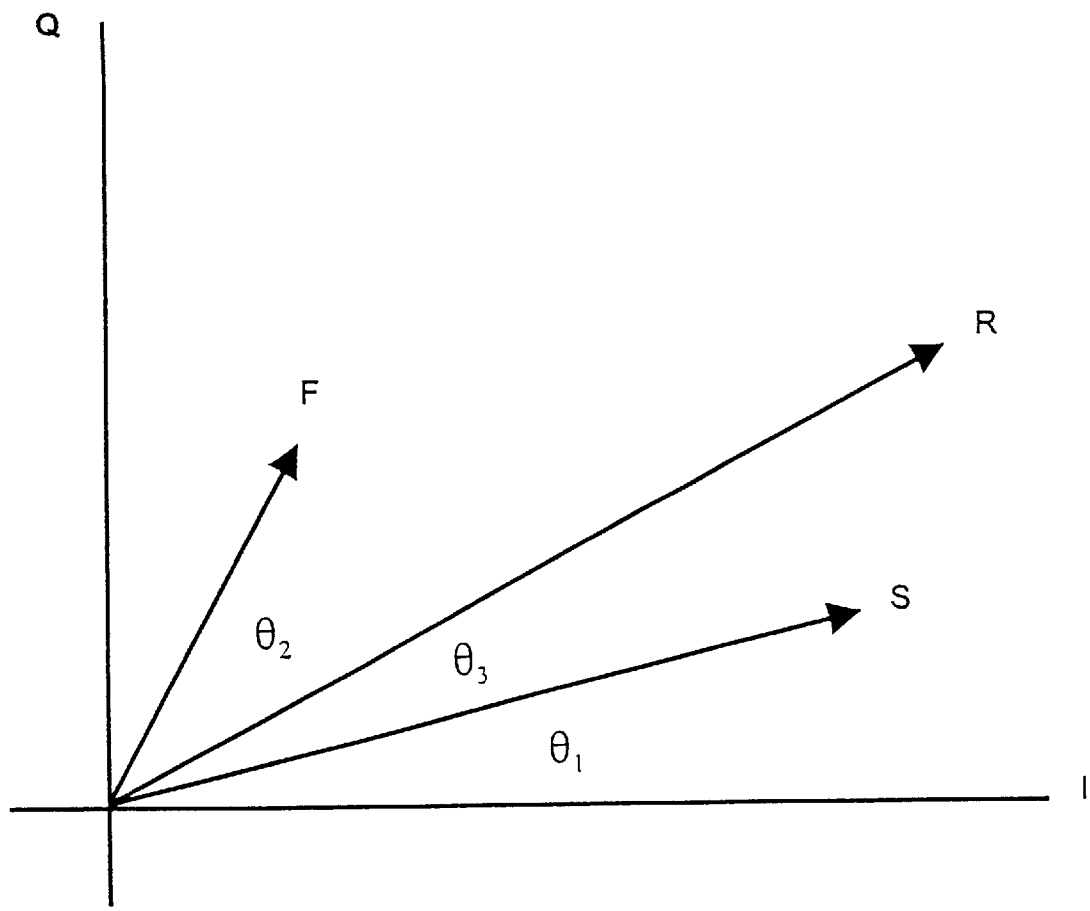
FIG. 8 is the vector representation of the fluorescence, scatter and the composite magnitude and phase.

FIG. 8 illustrates the vector phases and magnitudes of a two-component system of fluorescence and scatter. In the figure, the scatter, S, has an arbitrary phase that differs from the lock-in's reference along the I-axis. Physically, the scattering process is virtually instantaneous, but the scatter light has a finite measured phase shift due to optical path length and electronic delays. The fluorescence, F, has a magnitude less than that of the scatter and is phase shifted due to the excited-state lifetime. The lock-in measures the magnitude and phase of the composite vector, R. The output of one of the lock-in's PSDs is $$V_{psd1} = R \sin \Theta_3 = F \sin \Theta_2 + S \sin \Theta_1 \quad (3)$$

while the output of the other is $$V_{psd2} = R \cos \Theta_3 = F \cos \Theta_2 + S \cos \Theta_1 \quad (4)$$

Rearranging equations (3) and (4), the fluorescence is found to be $$F = \frac{R\sin\Theta_3 - \tan\Theta_1 R\cos\Theta_3}{\sin\Theta_2 - \tan\Theta_2\cos\Theta_1} \quad (5)$$

while the scatter is $$S = \frac{R\sin\Theta_3 - \tan\Theta_2 R\cos\Theta_3}{\sin\Theta_1 - \tan\Theta_2\cos\Theta_1} \quad (6)$$

The total phase shift of vector F is equal to the phase shift of the scatter vector S plus the relative phase difference between S and F due to the lifetime of the dye:

$$\Theta_2 = \alpha \tan(\omega\tau) + \Theta_1 \quad (7)$$

The only unknown quantity in the equations above is the scatter angle. In a single-component fluorescence measurement, the angle can be found empirically by varying its value until the ratio of fluorescence to scatter is maximized. If multiple fluorescent species are being nulled individually, the scatter angle can be determined prior to data collection by measuring the composite phase when the beam is in a portion of the gel known not to contain fluorescent dye.

Software versus hardware nulling was compared. An agarose DNA-fragment gel was stained with SYBR Green and scanned in continuous-wave mode, phase-nulling mode and with lock-in detection followed by software nulling. The scans using modulated fluorescence were averaged nine-fold. The electronic phase-nulled image had a higher SNR than the continuous-wave image, but the null was not perfect, allowing some baseline scatter to persist. The software-nulled image produced a still higher SNR, thanks to its empirically-determined nulling angle. The trade-off that comes with software nulling is that it fails if the lock-in outputs deviate from equations (3) and (4), as is the case when the PSDs saturate. Saturation occurred in portions of the gel which contained strongly-scattering surface contaminants. In these regions, even the incomplete electronic null suppressed the scatter signal below that seen in the continuous-wave scan, while the software null was less effective at suppressing the contaminants.

Phase-sensitive detection has been shown to have significant benefits when applied to fluorescence gel scanning. Under conditions where conventional continuous-wave scanning approached the limits of detection (SNR near unity), phase-detection electronics resulted in more than a doubling of the scanner's sensitivity. More importantly, the phase-sensitive detection transformed the character of the baseline from a largely unvarying signal to random noise. This transformation allows the application of signal averaging for the purposes of increasing the SNR and therefore the system's sensitivity. It was shown that the combination of phase-sensitive detection and signal averaging could increase the SNR of the scanner by over an order of magnitude.

This invention further provides an apparatus and method for a phase-nulling scanner. Phase nulling can be used to reduce non-random components in the signal. The non-random component can be a baseline component. If the substrate is characterized by more than one scattered or emitted light signal, one or more of the signals can be phase nulled and the remaining signal can be analyzed. The various signals can be sequentially phase nulled and the remaining ones sequentially analyzed. This has application for discrimination between multiple emitting dyes used to identify multiple species in a sample. In the phase-nulling scanner the light source is intensity modulated and the detection electronics are phase-sensitive and include phase-nulling electronics. The phase-nulling scanner can be a constant path length moving beam scanner as described above. For the constant path length scanner phase nulling can be accomplished electronically, for example with a lock-in amplifier, or by a combination of hardware and software. If the pathlength is not constant but it is deterministic, the pathlength variation can be removed in software and the phase nulling can be performed mathematically. A constant pathlength can alternatively be achieved with a moving optic system.

This invention further provides an apparatus and method for reducing both random and non-random noise components in an emitted light signal. The device has an intensity modulated light source and phase-sensitive detection electronics including phase-nulling electronics. The non-random component of the noise is reduced with phase nulling. The phase nulling can be achieved electronically or electronically and mathematically. The remaining signal is signal averaged to reduce the random component of the noise. This two-pronged approach to noise reduction can be used in a moving beam or moving optic scanner and can also be used in non-scanning emitted light detection.

This invention further provides a high-throughput gel scanner designed for highly automated, large-scale DNA and protein analysis. The mechanical design allows it to rapidly image gels while transporting them on a conveyor belt that can be integrated into an automated gel handling system. Translation of the samples provides at least one dimensional scanning of the substrates. Optionally the substrate translator can translate in more than one dimension. The substrate translator can be combined with a scanning optical beam to provide two dimensional scanning. The high throughput scanner can be used with or without phase sensitive detection. The scanning preferably keeps up with the rates of upstream and downstream sample processing steps.

Figure 9:
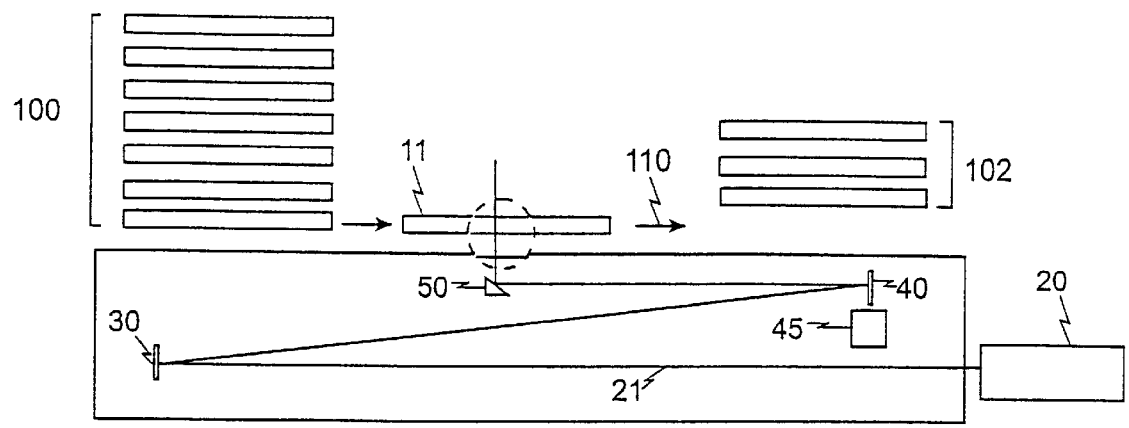
FIG. 9 is the high throughput scanner utilizing a conveyor belt sample feeder.

The high throughput scanner of this invention is illustrated in FIG. 9. Substrates are loaded into the scanner from tray feeder 100 and unloaded into tray feeder 102. The substrates are transported on a conveyor belt, not illustrated but indicated by arrows 110. Substrate 11 is in the measurement region wherein light beam 21 intercepts the substrate. The optical excitation train comprises light source 20, focusing mirror 30, scanning mirror 40 mounted on scanning motor 45, and steering mirror 50. The beam is scanned along the scan arc which is in the direction substantially perpendicular to the page. The conveyor belt translates the substrate in a direction substantially orthogonal to the scan arc, whereby two dimensional scanning is achieved. The substrates move continuously from the loading feeder through the measurement region to the unloading feeder.

Figure 10:
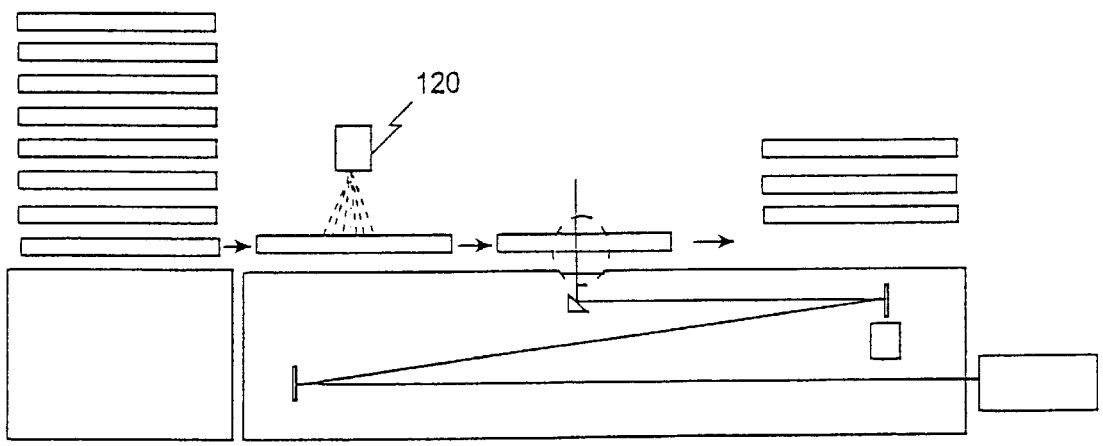
FIG. 10 is the high throughput scanner further including a gel stainer.
Figure 11:
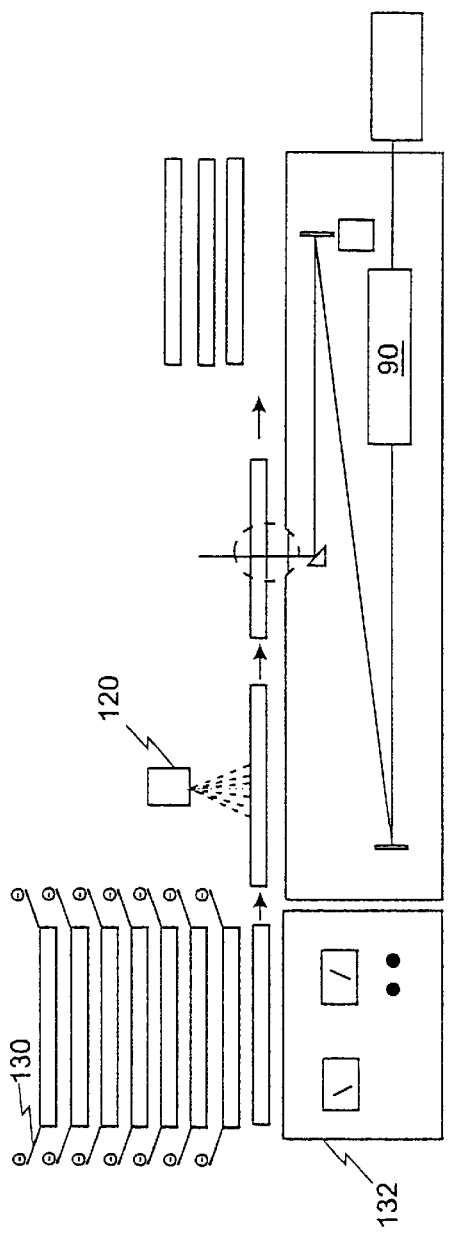
FIG. 11 is the high throughput scanner further including a gel electrophoresis apparatus.

The scanner can further include a sample preparation apparatus. As shown in FIG. 10, the scanner can include gel stainer 120. The scanner can further include integral electrophoresis apparatus as shown in FIG. 11. The electrophoresis apparatus includes electrodes 130 and power supply 132. FIG. 11 also illustrates laser intensity modulator 90 for implementing phase sensitive detection.

Figure 12:
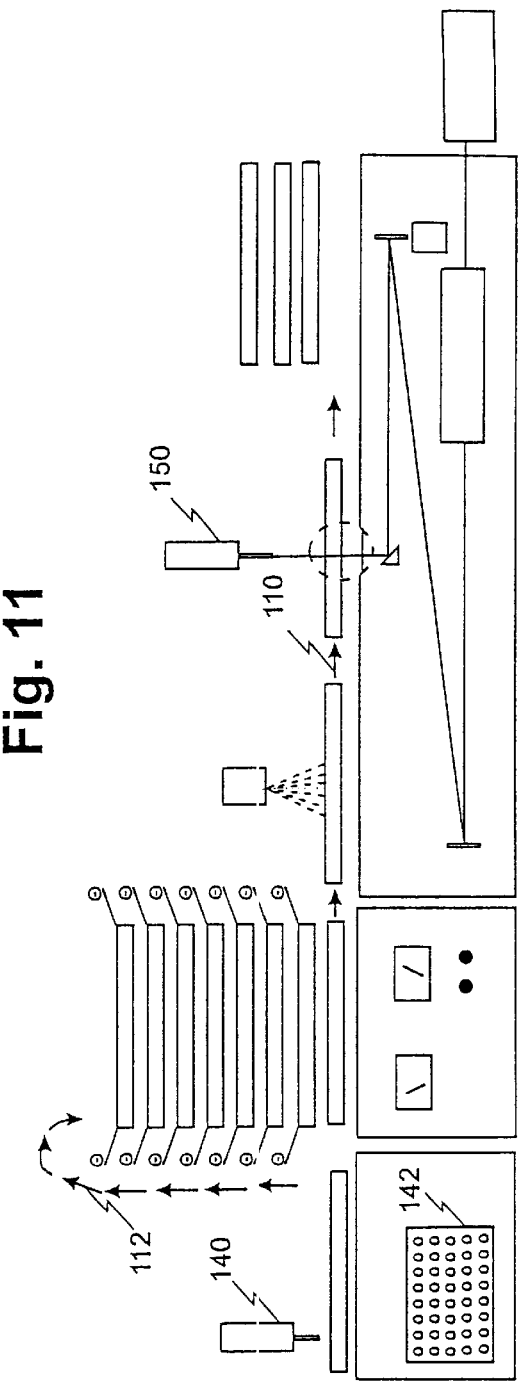
FIG. 12 is the high throughput scanner further including a sample loader and a sample extractor.

The scanner can further include an apparatus for sample loading and removing as shown in FIG. 12. Sample loader 140 places drops of sample on the gels from a multi-sample carrier 142. After loading the sample, the gel is lifted as indicated by arrows 112 to the top of loading feeder 100. Electrophoresis takes place in the loading feeder as the substrates move from the top of the loading stack to the bottom of the stack. The substrates are translated by the conveyor belt, indicated by arrows 110, to the gel stainer and to the measurement region. In the measurement region portions of the gel can be removed by sample extractor 150. The sample extractor can be, for example, a sampling needle. When the scanner detects a band of interest, the sample extractor can be moved into position to remove a portion of the separated sample. The positioning can be based on the position of the scanning mirror, which correlates with the position of the laser beam along the scan arc. The sample extractor can be further guided into position by detecting reflection of the light beam by the extractor.

Figure 13:
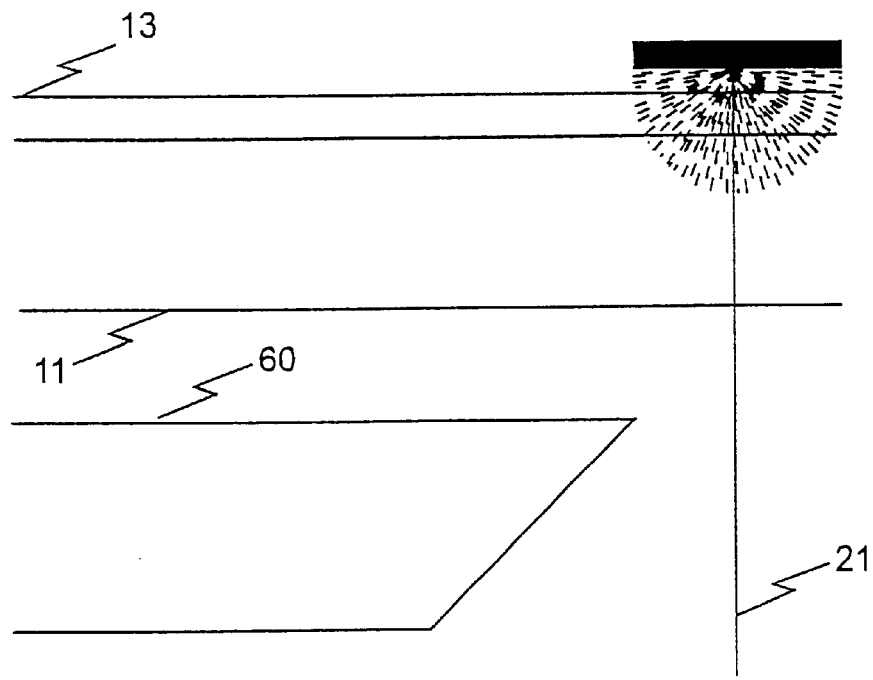
FIG. 13 shows the light collection scheme for scatter-assisted imaging.

This invention further provides a multiple-sample-type scanner that can image a wide variety of sample types in addition to fluorescently-stained gels. These sample types include silver-stained protein gels, developed x-ray films, storage phosphor screens, and membrane-bound fluorescent probes. Silver-stained gels and x-ray films require the measurement of optical density. In this embodiment the reflected laser power itself is monitored by the detector. Absorbance by a dark spot in the gel or film is manifested as a drop in optical power. Because the scan beam geometry and optical filtering in the high throughput scanner are optimized for fluorescence detection, laser light is deliberately prevented from reaching the detector under normal operating conditions. In order to measure absorbance, the laser must pass through the gel or film and then be redirected into the waveguide for detection. This is accomplished by placing a diffusely scattering surface behind the gel or film. The scatter-assisted scanner is shown in FIG. 13. Light beam 21 passes through substrate 11, is partially absorbed, and is isotropically scattered off diffuse reflector 13. A portion of the light passes back through the target and enters waveguide 60. The spatial resolution of the image is slightly lower than fluorescence images due to the need for detected light to travel through the absorbing medium by two distinct paths. The degradation is proportional to the distance between the reflector and the medium. The long-pass filter used for fluorescence detection is replaced with a band pass filter centered at the wavelength of the light source to allow the laser light to enter the detector while rejecting the vast majority of stray room light. Isotropic scattering can be effected with a piece of white paper placed in contact with the gel or film. A scanner which can be readily switched between fluorescent and scattering substrates utilizes a strip of scattering material such as opal glass that hinges into the beam path for absorbance measurements.

A silver-stained two-dimensional protein gel of a yeast extract was measured by the scanner. The scatter-assisted absorbance image compares very well to direct visualization. Spots that are difficult to see in the original gel are plainly visible in the scanned image. The scanner worked equally well for x-ray films. The contrast level was lower than the silver-stained gel due to the higher absorbance of the film's emulsion. Nevertheless, the scanner was capable of imaging all visible spots on the film.

Figure 14:
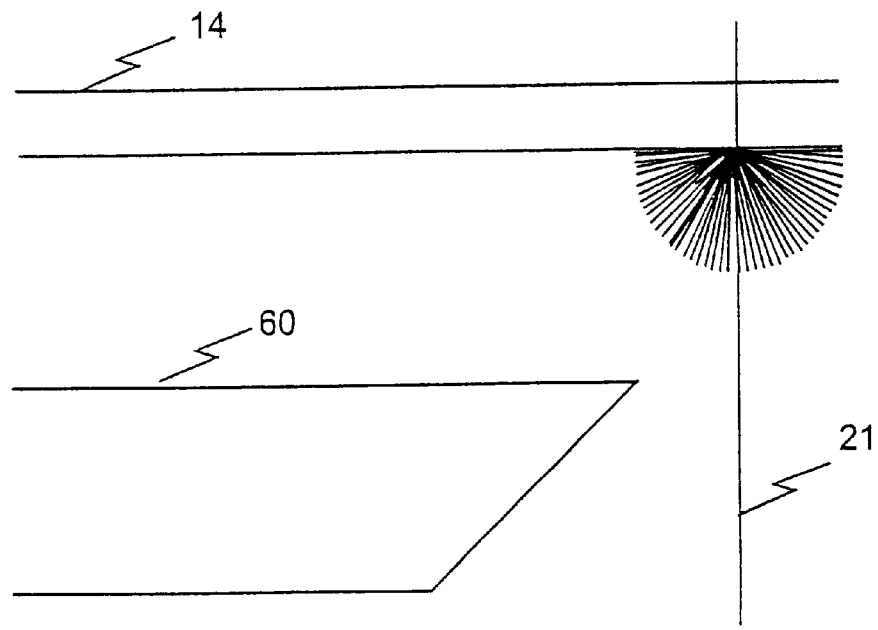
FIG. 14 shows the light collection scheme for latent phosphorescence imaging.

A common substitute for x-ray films in the detection of radioactive probes is the storage phosphor screen. These screens are coated with a europium compound that stores a latent phosphorescent image when exposed to a radioactive membrane. The phosphorescence is released at 390 nm when the screen is exposed to light from a helium-neon laser with a wavelength of 633 nm. Schott BG1 or BG3 filters are well-suited to the requirements of this system, passing 390 nm light while rejecting 633 nm light. The scanner can be used to detect the latent phosphorescence image via the collection scheme shown in FIG. 14. Substrate 14 is scanned, face down, by helium-neon laser beam 21. Phosphorescence is collected by the waveguide 60 and detected after filtering by a BG3 filter, which blocks the intense laser scatter from the screen. Phase nulling can be used to eliminate laser scatter in phosphorescence images in much the same way as it is used with fluorescence images, though phosphorescence lifetimes are generally orders of magnitude longer than fluorescence lifetimes. In order to propagate phosphorescence, the waveguide is preferably a glass waveguide with an effective transmission limit that extends beyond 300 nm or the signal is collected by a mirror.

In order to accommodate a variety of sample types, the multiple-sample-type scanner of this invention can employ a plurality of light sources, for example a He—Ne laser and an argon ion laser. The scanner can further utilize a variety of spectral filters, for example band pass and long pass filters. It can further use a removable diffuse reflector. The multiple-sample-type scanner can employ, but is not limited to, the constant pathlength optical train of this invention. It can further comprise a substrate translator. It can employ, but is not limited to, phase-sensitive detection.

The scanner of this invention has been illustrated with a few specific embodiments. It will be readily apparent to those skilled in the art that there are numerous variations and combinations thereof which fall within the spirit and scope of this invention. The range of this invention is limited only by the following claims and equivalents thereof.

We claim:

1. A constant pathlength optical train for coupling light to a substrate and for coupling scattered or emitted light from the substrate to a photodetector, comprising:

a light source for providing a light beam;

a scanning mirror assembly positioned to receive said light beam from said light source and sweep it across a steering mirror;

a steering mirror positioned to receive said light beam from said scanning mirror assembly and reflect it to the substrate, whereby it is swept across the substrate along a scan arc; and a photodetector positioned to receive emitted or scattered light from the substrate;

phase-sensitive detection electronics coupled with said photodetector;

said optical train being constructed and arranged such that a substantially constant optical pathlength from the light source to the photodetector is maintained throughout the sweep of said beam across the substrate.

2. A phase-nulling scanner, comprising:

an intensity modulated light source for providing a light beam;

means for scanning said beam across a substrate;

a photodetector positioned to receive emitted or scattered light from the substrate; and phase-sensitive detection electronics, including phase-nulling electronics, coupled with said photodetector.

3. The phase-nulling scanner of claim 2 wherein said means for scanning comprises a moving optic system.

4. The phase-nulling scanner of claim 2 wherein said means for scanning comprises a moving beam system.

5. The phase-nulling scanner of claim 4 wherein said moving beam system comprises a scanning mirror assembly positioned to receive said light beam from such light source and sweep it across said substrate.

6. The phase-nulling scanner of claim 4 wherein said moving beam system is a constant path length moving beam system.

7. The phase-nulling scanner of claim 4 wherein said moving beam detection system is a non-constant path length moving beam detection system.

8. The phase-nulling scanner of claim 2 wherein said phase-nulling electronics include a computer for mathematical phase nulling.

9. A method for removing a non-random component from a scanned optical signal, comprising:

scanning an intensity modulated light beam across a substrate;

phase sensitively detecting emitted or scattered light from said substrate, whereby a detected signal is produced having both a desired component and an undesired non-random component;

phase nulling said undesired non-random component from said detected signal.

10. The method of claim 9 wherein said undesired non-random component is a baseline signal.

11. The method of claim 9 wherein said desired component is a first luminescence signal from said substrate and said undesired non-random component is a second luminescence signal from said substrate, whereby said phase nulling removes said second luminescence signal from said first luminescence signal.

* * * * *

UNITED STATES PATENT AND TRADEMARK OFFICE
CERTIFICATE OF CORRECTION

PATENT NO.    : 6,384,951 B1
DATED         : May 7, 2002
INVENTOR(S)   : Basiji et al.

Figure 1B:
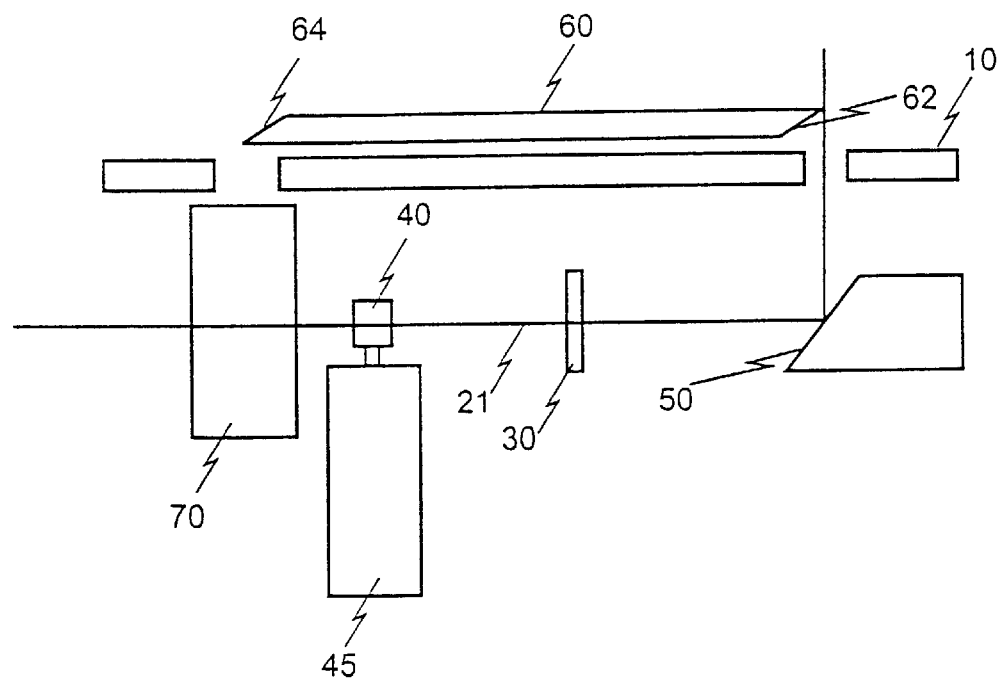

It is certified that error appears in the above-identified patent and that said Letters Patent is hereby corrected as shown below:

Drawings,
Please replace Figure 1B with the corrected Figure 1B below:

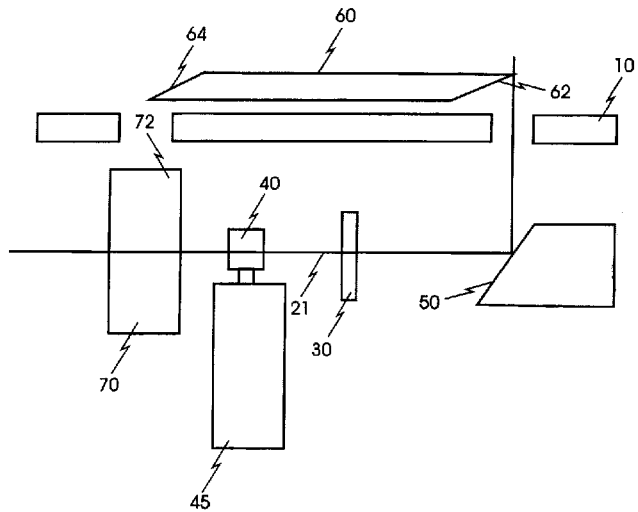

FIG. 1B

Signed and Sealed this

Seventh Day of January, 2003

JAMES E. ROGAN
*Director of the United States Patent and Trademark Office*